UNITED STATES PATENT OFFICE 2,556,437

COPOLYMERS OF VINYL ACETATE AND ALLYL CARBANILATES

David T. Mowry and George E. Ham, Dayton, Ohio, assignors to Monsanto Chemical Company, St. Louis, Mo., a corporation of Delaware No Drawing. Application December 30, 1948, Serial No. 68,395

4 Claims. (Cl. 260—77.5)

This invention relates to new copolymers of vinyl acetate having very desirable properties as are hereinafter described. More specifically the invention relates to new copolymers of vinyl acetate and unsaturated esters of various carbanilic acids.

Polyvinyl acetate and numerous copolymers of vinyl acetate and other polymerizable compounds are known and widely used industrially. These plastic compositions, however, have limited industrial application because of their solubility in many commonly encountered organic liquids and their poor stability at elevated temperatures. The low tensile and flexural strengths of polyvinyl acetate also restrict its uses.

The purpose of this invention is to provide new vinyl acetate copolymers having unusual resistance to heat and improved tensile and flexural properties. A further purpose of this invention is to provide a means of polymerizing vinyl acetate and improving the physical properties of the polymeric composition.

In accordance with this invention it has been found that copolymers may be prepared of vinyl acetate and compounds having the structural formula:

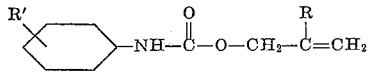

wherein R is a radical of the group consisting of hydrogen, methyl and chlorine, and R' is a radical of the group consisting of hydrogen, methyl and chlorine. Useful copolymers can be prepared by using from 80 to 99 precent of the vinyl acetate and from one to 20 percent of the comonomer. The use of less than one percent of the comonomer ordinarily does not produce a sufficient improvement to justify the practice, and the use of more than 20 percent causes a serious reduction in the rate of polymerization and the yield of copolymer. The allyl, methallyl, and chloroallyl monomers alone are polymerized only with difficulty and do not form polymers of desirable physical properties.

Suitable esters for the preparation of copolymers with vinyl acetate are:

Allyl o-methyl carbanilate
Methallyl p-chloro carbanilate
Methallyl p-methyl carbanilate
β-Chlorallyl carbanilate
Allyl o-chloro carbanilate
β-Chlorallyl p-chlorcarbanilate The new compositions differ from polyvinyl acetate in the preferred method of their preparation, emulsion polymerization techniques being employed. In accordance with the conventional emulsion polymerization practice the monomers are heated in an aqueous medium in the presence of emulsion stabilizing agents and peroxy catalysts. Suitable peroxide compounds for the practice of this invention are the water soluble peroxy compounds, such as hydrogen peroxide, sodium peroxide and the water soluble salts of various peroxy acids, for example sodium perborate, potassium persulfate, or any other water soluble compounds containing the peroxide grouping (—O—O—). Under some circumstances peroxides which are soluble in the oil or monomer phase of the reaction medium may be used, for example benzoyl peroxide and t-butyl hydroperoxide. In the usual practice of this invention from 0.001 to 1.0 percent by weight of the catalyst may be used. When higher proportions of the allyl ester, for example from 10 to 20 percent are used, it is sometimes desirable to use higher proportions of the catalyst, for example up to 3 percent.

The emulsion polymerizations are usually conducted in the presence of reagents which are surface active and promote the intimate dispersion of the oil and water phases of the reaction medium. These surface active agents are usually organic compounds containing radicals which are hydrophobic and other radicals which are hydrophilic in nature. Suitable compounds of this type are the water soluble salts of long chain fatty acids, such as sodium stearate, the common "soaps" prepared by the saponification of animal and vegetable oils, the "rosin soaps" such as ammonium rosinate or mixtures of salts as prepared from naturally occurring rosin acid mixtures, the "amino soaps," such as triethanolamine and N-dodecylmethylamine, the salts of half esters of sulfuric acid and long chain aliphatic alcohols, such as sodium lauryl sulfate, salts of sulfonated hydrocarbons, such as sodium alkylbenzenesulfonates, and in general any organic compound containing both hydrophobic and hydrophilic radicals. The emulsion agents may be used in widely varying proportions, but preferred practice involves the use of 0.1 to 5 percent by weight of the monomers being polymerized.

The polymerizations are conducted by mixing the essential ingredients at temperatures which induce the polymerization, for example from 50 to 90° C. A preferred method of conducting the polymerization involves the initial charging of the reactor with water, catalyst and emulsifying agent and heating this mixture to the approximate temperature of polymerization. The monomers are then mixed in a separate vessel in the proportions at which they are desired in the ultimate copolymer. The previously mixed monomers are then gradually added to the heated reactor at a rate approximately equal to the rate of polymerization, whereby a substantially uniform concentration of reactants are present in the reaction mass. A convenient means of following the reaction involves the observing of the reflux temperature and the regulation of the rate of monomer addition so as to maintain a constant reflux temperature. By this procedure a substantially uniform rate of reaction and a product of uniform chemical and physical properties is obtained.

Other expedients are possible for assuring uniform rates of polymerization and optimum quality of polymer. Since the proportions of monomer in the reaction vessel are frequently substantially different from the proportions being polymerized, more uniform products may be prepared if the reaction vessel is initially charged with the proportions of monomer which are required to produce a copolymer of the desired proportions, and thereafter charging the vessel with comonomers in the proportion desired in the ultimate polymer. At the end of the reaction, after all of the monomers have been added to the reaction vessel, the proportion of unpolymerized monomer in the reaction mass may change due to the depletion of the more reactive monomer. To prevent the formation of polymers of different proportions of monomeric components, it is desirable to interrupt the reaction short of completion. This may be done by removing one of the essential conditions for polymerization, for example lowering the temperature, by precipitating the emulsion or by destroying the catalyst by chemical reaction.

Other modifications, for example the gradual introduction of emulsifying agent and catalyst to the polymerization vessel, the removal of monomers by steam distillation and other conventional expedients in the polymer art may be practiced.

The emulsion polymerizations are preferably conducted in glass or glass-lined vessels which are provided with efficient means for agitating the contents. Generally rotary stirring devices are the most effective means of assuring the intimate contact of the reactants but other methods may be successfully employed, for example by rocking or tumbling the reactors. The emulsion polymerization equipment generally used in the synthetic resin industry is useful.

The polymers prepared in accordance with this invention are readily maintained in emulsified condition, and do not require high water-monomer ratios, or large proportions of emulsifying agents as do conventional vinyl acetate polymers. The new compositions are particularly useful as molding materials, but are also useful in the preparation of surface coatings and adhesives.

Further details of the practice of this invention are set forth with respect to the following examples.

Example 1

A polymerization reactor, provided with an efficient rotary stirring device and a reflux condenser, was charged with 2000 parts by weight of distilled water, 5 parts of the sodium salt of the di-2-ethylhexyl ester of sulfosuccinic acid, and 5 parts of potassium persulfate and the mixture heated to approximately 70° C. A mixture of 900 parts by weight of vinyl acetate and 100 parts of allyl carbanilate were gradually introduced over a period of three hours, at rates which permitted the maintenance of the temperature at 75° C. As soon as all of the monomer had been added the emulsion was steam distilled to remove unreacted monomers and frozen to precipitate the emulsion. The polymer was separated by filtration, washed with water and dried. The polymer was recovered in 100 percent yield and was found to have a tensile strength of 5640 pounds per square inch and a flexural strength of 13,000 pounds per square inch. Control samples of polyvinyl acetate were found to have a tensile strength of 4010 pounds per square inch and a flexural strength of 3707 pounds per square inch.

Example 2

Using the procedure similar to that of the preceding example, 98 percent by weight of vinyl acetate and 2 percent of allyl carbanilate were polymerized. The polymer which was recovered in a yield of 100 percent was found to have a flexural strength of 6,600 pounds per square inch, indicating a substantial superiority to polyvinyl acetate.

Example 3

The procedure of Example 1, was duplicated except that 80 percent of vinyl acetate and 20 percent of the allyl carbanilate were copolymerized. The recovered polymer had useful physical properties but was recovered in only a 30 percent yield, indicating slower reaction rates.

Example 4

Using the procedure of Example 1, 90 parts by weight of vinyl acetate and 10 parts of methallyl carbanilate were polymerized in the presence of 0.2 percent potassium persulfate and 0.2 percent of the di-2-ethylhexyl ester of sodium sulfosuccinate. A 100 percent yield was recovered after two hours polymerization at 70° C.

Example 5

Two copolymers each of 90 percent vinyl acetate and 10 percent of $\beta$-chloroallyl carbanilate, and 10 percent allyl p-chlorocarbanilate, respectively, were prepared by polymerization in the presence of 0.4 percent of potassium persulfate and 0.2 percent of di-2-ethylhexyl ester of sodium sulfosuccinic acid.

Example 6

The copolymers prepared in accordance with Examples 1 and 2, and a sample of polyvinyl acetate were tested by the standard Clash-Berg test to determine the flex temperatures. In accordance with this test molded specimens are cooled to a temperature of approximately −50° C., and gradually heated while observing the change in the modulus of rigidity, the flex temperature being that temperature at which the modulus of rigidity is 135,000 pounds per square inch. The following table shows the improvement in flex temperature of the copolymers as compared to polyvinyl acetate.

|  | Flex Temp. |
|---|---|
| Copolymer of 90% vinyl acetate and 10% allyl carbanilate | 42.5 |
| Copolymer of 98% vinyl acetate and 2% allyl carbanilate | 34 |
| Polyvinyl acetate | 25 |

The invention is defined by the following claims:

1. A uniform homogeneous copolymer of 80 to 99 percent vinyl acetate and one to 20 percent of a compound having the structural formula:

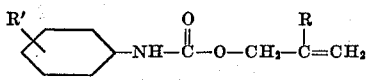

wherein R is a radical of the group consisting of hydrogen, methyl and chlorine, and R' is a radical of the group consisting of hydrogen, methyl and chlorine.

2. A uniform homogeneous copolymer of 80 to 99 percent vinyl acetate and one to 20 percent of allyl carbanilate.

3. A uniform homogeneous copolymer of 80 to 99 percent vinyl acetate and one to 20 percent of methallyl carbanilate.

4. A uniform homogeneous copolymer of 80 to 99 percent vinyl acetate and one to 20 percent of β-chloroallyl carbanilate.

DAVID T. MOWRY.
GEORGE E. HAM.

REFERENCES CITED

The following references are of record in the file of this patent:

UNITED STATES PATENTS

| Number | Name | Date |
|---|---|---|
| 2,388,851 | Kenyon et al. | Nov. 13, 1945 |
| 2,466,404 | Fowler et al. | Apr. 5, 1949 |